United States Patent Office 3,301,656
Patented Jan. 31, 1967

3,301,656
METHOD OF REDUCING CAKING TENDENCY OF UREA-PARAFFIN WAX FERTILIZER
Robert H. Campbell, Brookhaven, Pa., and Steven G. Belak, Claymont, Del., assignors to Sun Oil Company, Philadelphia, Pa., a corporation of New Jersey
No Drawing. Filed Feb. 20, 1964, Ser. No. 346,067
6 Claims. (Cl. 71—28)

This application is a continuation-in-part of application Serial No. 308,062, filed September 11, 1963, by R. H. Campbell and S. G. Belak, now abandoned.

This invention relates to a method of preparing slow release fertilizer compositions having improved anti-caking properties. The compositions exhibit essentially no caking tendencies under the conditions normally encountered in storage or shipment. The compositions comprise a plurality of fertilizer particles each of which contains a core which is a dispersion of urea in paraffin wax. The core is overlaid with a thin film of a urea-paraffin wax adduct. Because the adduct film is hard and has a high melting point, the particles show no tendency to stick together when stored under conditions of temperature and pressure equal to or even worse than those normally encountered in actual commercial handling.

The need for slow release fertilizers is well known. A slow release fertilizer is resistant to leaching by water and provides nutrients to the plants being fertilized at a predetermined rate irrespective for the most part of rainfall and other climatic conditions. Several such fertilizers have been proposed. One, for example, can be prepared by dispersing the fertilizer in molten paraffin wax, forming the dispersion into small fertilizer size particles by means of, say, a mold, and allowing the particles to cool below the melting point of the wax. The resulting particles are a dispersion of solid fertilizer particles in solid wax. When submerged in water the fertilizer is leached out of the particles only gradually, hence the particles are a slow release fertilizer. The particles can be any of the conventional solid fertilizer compounds such as sodium or potassium nitrate, potassium sulfate, urea, mono- or diammonium phosphate, superphosphate or triple superphosphate, calcium cyanamide, potassium chloride, etc. Where it is desired that the fertilizer contain a source of nitrogen urea is preferred because it contains a higher nitrogen content than the other nitrogen fertilizers mentioned. In a copending application, Serial No. 308,251, filed September 11, 1963, now U.S. Patent No. 3,252,786, slow release urea fertilizer compositions have been disclosed which have a higher water resistance than a dispersion of urea in wax as described above. These improved compositions comprise a dispersion of urea in wax, the wax having rosin and optionally, but preferably, asphalt dissolved therein. These compositions are described in more detail subsequently.

Any slow release fertilizer which comprises a dispersion of a fertilizer compound such as urea in wax has the disadvantage that the particles thereof generally tend to cake or congeal under some of the conditions normally encountered during normal storage and shipment of the fertilizer. The wax component of such fertilizers usually has a melting point of 125°–150° F. Such temperatures, however, are not unknown in warehouses and boxcars during the summer. If a bag of discrete particle of a dispersion of a fertilizer in wax is exposed to a temperature higher than the melting point of the wax component of the particles, the wax melts and the discrete particles become a single fluid mass. Even if the melting point of the wax is actually above the temperatures encountered during storage and shipment, the wax often becomes soft enough at these latter temperatures so that when bags of the discrete particles are stacked in piles 5–20 bags high, as is normal procedure, the pressure on the particles near the bottom of the pile is sufficient to cause these particles to agglomerate into large lumps.

We have now found a method of preparing slow release urea fertilizer compositions which although they are a dispersion of urea in wax do not possess the above-mentioned disadvantages. The compositions are stable at temperatures substantially above the melting point of the wax contained therein and can be subjected to conditions of temperature and pressure substantially more severe than those which would be normally encountered in commercial distribution without caking, agglomerating, congealing, etc.

The compositions are, of course, in the form of small, discrete fertilizer size particles. Each particle contains a core which is overlaid with a thin film which substantially completely covers the surface of the core. The core is a dispersion of urea in paraffin wax. The wax phase of the dispersion will in many cases contain one or more additives. The surface film covering this core is a urea-paraffin wax adduct. The film can be formed by contacting a particle which is a dispersion of urea in paraffin wax with an adduct accelerator such as acetone. An adduct accelerator causes the urea and paraffin wax at the surface of the dispersion particle to react to form a urea-paraffin wax adduct, the reaction occurring over substantially the entire surface of the dispersion particle. Stated in another manner, an adduct accelerator initiates, over substantially the entire surface of the particle, a reaction between the urea and paraffin wax at the surface of the particle to form an adduct. The resulting particle contains a core or center portion which is a dispersion of urea in wax and a thin film, overlaying and adjacent to the core or center portion, of a urea-paraffin wax adduct.

The preparation of the non-caking fertilizer compositions is best illustrated by first describing the preparation of the particles which have no surface film but which are a dispersion of urea in paraffin wax, herein referred to as the base fertilizer particles, and then describing the treatment of such particles in order to form the surface film thereon.

The base fertilizer particles can be prepared in any suitable manner. For example, the paraffin wax is heated to above its melting point, the urea is added to the molten paraffin wax and the mixture is stirred in order to uniformly disperse the urea in the molten paraffin wax. The resulting dispersion is then shaped into fertilizer size particles by means of a pellet mold, etc., and the resulting particles are allowed to cool to a temperature below the melting point of the wax. The resulting particles are a dispersion of solid urea in solid wax. Substantially all the particles of urea are surrounded by and encased in wax.

In forming the base fertilizer particles it is desirable for several reasons that the urea be of small particle size. One reason is that the uniformity of the rate at which the urea is released to the plants when the non-caking fertilizer is ultimately placed in the soil is directly proportional to the uniformity of the fertilizer particle. The uniformity of the fertilizer particle is increased, of course, as the urea particle size decreases. The second reason for using small particle size urea is that the film of urea-paraffin wax adduct to be subsequently formed on the base particle is formed through a reaction of the urea at the surface of the base particle. Therefore, the amount of surface of the base particle which is actually covered by the subsequently formed adduct film varies with the distribution of urea (and the wax also) at the surface of the base particle. Preferably the distribution of urea at the surface of the base particle is substantially uniform over the entire surface of the base particle. This is also accomplished by using relatively small particle size urea. Preferably the urea dispersed in the paraffin wax has a particle size of smaller than 100 mesh, more preferably smaller than 200 mesh. All mesh sizes herein are by U.S. Standard Sieves.

When the urea employed is smaller than about 100 mesh it tends to agglomerate into lumps which make it somewhat difficult to form a uniform dispersion of the urea in the wax in conventional agitated mixing vessels. This problem is readily overcome by forming an initial gross dispersion of relatively large size urea, such as commercial crystal urea which is mainly larger than 100 mesh, in the molten wax, and then passing this gross dispersion through a roller mill having a roller clearance sufficiently low to subdivide the urea particles to the desired size. By this technique the particle size of the urea dispersed in the wax is easily reduced to as small as 200 mesh or even 400 mesh. The dispersion discharged from the roller mill is usually a dry solid because the wax has solidified but upon reheating the dispersion the wax melts again.

In forming the base fertilizer particles any kind of paraffin wax can be used, paraffin wax being distinguished from other types of waxes hereinafter. However, it is preferable that the paraffin wax have a relatively low melting point for it has been found that in subsequently forming the adduct film on the surface of the base particles the necessary time of contact between the base particles and the adduct accelerator varies directly with the melting point of the paraffin wax. Thus when the paraffin wax in the base particles has a melting point of 130° F., for example, the contact time is generally less than when the base particle paraffin wax has a melting point of, for example, 150° F. For this reason it is preferable that the paraffin wax used in forming the base particles have a relatively low melting point, e.g., 110°–145° F., although as discussed hereinafter paraffin waxes of other melting points can be employed if desired.

When urea is dispersed in molten paraffin wax, preparatory to forming small fertilizer particles, the urea and wax often react to form an adduct before the dispersion can be shaped into small particles. The time required for this reaction to take place depends mainly upon the urea particle size. When the urea is larger than 100 mesh adduction may not occur for 15–20 minutes. On the other hand, if the urea is smaller than 100 mesh, say 200 mesh, adduction usually occurs in less than 5 minutes. Since this may not be enough time to form the dispersion into small particles it will usually be desirable to include in the paraffin wax phase an adduct inhibitor which is effective to prevent or at least substantially delay the adduct reaction. Suitable inhibitors which can be used are wax soluble polymers of vinyl type compounds such as polyethylene, polyisobutylene, copolymer of ethylene and vinylacetate, etc.; wood rosin in any of its various conventional forms; fatty acid nitrogen compounds such as fatty amides, fatty amines; alkanol amines such as triethanol amine; wax soluble condensation polymers such as wax soluble alkyd resins; microcrystalline wax, and the like. The amount of inhibitor used to prevent adduction is usually about 1–20%, preferably 3–10%, although higher amounts can also be used. In some cases, mentioned hereinafter, such higher amounts are sometimes desirable. It will be noted subsequently that the presence of the adduct inhibitor does not prevent the subsequent formation of the adduct film on the surface of the base particle.

It may also be desirable in some cases to incorporate certain other additives in the paraffin wax prior to dispersing urea therein. In the aforesaid copending application two additives, rosin and asphalt, are disclosed which when dissolved in the wax component of a slow release fertilizer comprising a dispersion of urea in wax improve the properties thereof. The incorporation of either of these additives in our present compositions is a preferred embodiment thereof. The rosin, which can be wood, gum or tall oil rosin, and which can be unmodified rosin or any of the various rosin derivatives such as polymerized rosin, hydrogenated rosin, rosin esters, metal salts of rosin, etc. serves as an adduct inhibitor and also improves the water resistance of the fertilizer. For this latter purpose two types of rosin are preferred, although any others can also be used. One preferred rosin is the partially oxidized calcium salt of polymerized wood rosin, the salt containing (before oxidation) 7–10% calcium. This material is available in the unoxidized form as an article of commerce or can be made by known methods. Partial oxidation is disclosed in the aforesaid application as a means of further improving the effectiveness of certain rosins for improving the water resistance of a urea-wax slow release fertilizer. The partial oxidation can be effected at any temperature but should be equivalent to oxidation in the presence of air, at atmospheric pressure, and at 140° F. for a time sufficient to improve the water resistance of the fertilizer composition when the latter is submerged in water. Water resistance is determined by submerging the particles in water and determining the amount of urea dissolved therein after 72 hours. Preferably the oxidation time is 1–8 days, more preferably 2–6 days. Prior to oxidation the rosin should be subdivided to 10–20 mesh. The other preferred rosin is polymerized wood rosin partially oxidized to the same extent as described for the calcium salt of polymerized wood rosin.

The other additive disclosed in the aforesaid application is asphalt. If rosin is present in the wax, asphalt effects a further improvement in the water resistance of the resulting fertilizer. Regardless of whether rosin is present or not, the asphalt renders the dispersion of urea in wax substantially more fluid than it is without the asphalt. When small size, say 200 mesh, urea particles, or any other fertilizer particles, are dispersed in wax the resulting dispersion is very viscous, having a putty-like consistency. However if asphalt is present in the wax when the dispersion is formed, the subsequent dispersion is very fluid, having about the fluidity of paint or melted chocolate.

The amount of rosin normally employed will be a minor amount, i.e., less than 50%, based on the total weight of wax and rosin if asphalt is absent, or based on the total wieght of wax, rosin, and asphalt where the latter is also used. Preferably the amount of rosin is 2–35%, more preferably 3–20%. All percentages and parts herein are by weight. Where asphalt is used to fluidize a dispersion of urea in wax it should be used in amount of 1–20%, preferably 3–10%, by weight of the wax. Where asphalt is incorporated into the wax to improve the fertilizer water resistance, in which case rosin will also be present, the amount of asphalt should be a minor amount, based on the total weight of wax, rosin, and asphalt, effective to improve the fertilizer water resistance, preferably 0.25–40.0%, more preferably 3–20%.

In dispersing urea in paraffin wax to form the base particles of the invention, the relative amounts of urea and wax phase, the wax phase being defined as the paraffin wax plus any additives dissolved therein, will depend mainly upon the desired water resistance of the ultimate non-caking fertilizer particles and upon whether the ultimate particles are to contain other fertilizer ingredients in addition to urea. If urea is to be the only fertilizer ingredient in the base particles the amounts of urea and wax phase will normally be a major amount of urea, i.e., over 50%, and a minor amount, i.e., less than 50%, wax phase, the amounts and percentages being based on the total composition weight, although higher or lower amounts can also be used. In most cases the amount of urea will be 50–80%, more frequently 50–70% and the amount of wax phase will be 15–49%, more frequently 25–49%. If any additives are present in the paraffin wax the wax phase will normally contain a major amount of paraffin wax and a minor amount of additives.

If the fertilizer is to contain other solid fertilizer ingredients, such as any of those previously mentioned, the total amount of fertilizer ingredients will normally be a major amount and the amount of wax phase will normally be a minor amount. In most cases the total fertilizer ingredients will be 50–80%, more frequently 50–70%, and the amount of wax phase will be 15–49%, more frequently 25–49%, the percentages and amounts again being based on the total composition. However, the actual amount of urea in the composition may be relatively low. For example, a slow release 5–15–10 complete fertilizer, i.e., a slow release complete fertilizer containing 5% nitrogen as N, 15% phosphorus as $P_2O_5$, and 10% potassium as $K_2O$, all by weight of the total composition, might contain 10.7% urea, 32.6% triple superphosphate, 18.5% potassium sulfate, and 38.2% wax phase. Usually the amount of urea will be at least 10% based on the total composition, more frequently at least 20%.

Thus, considering both the case where urea is the sole fertilizer ingredient and the case where a plurality of fertilizer ingredients are used the amount of urea will be 10–80%, usually 10–70%, more frequently 20–70% and the wax phase will usually be 15–49%, more frequently 25–49%.

It is generaly desirable that the amount of urea and paraffin wax in the base particles be at least 10% and 15% respectively. This represents no serious obstacle since slow release urea-wax fertilizers will normally contain at least these amounts of urea and wax. Below these amounts, however, it is sometimes more difficult to form an adduct film which substantially completely covers the particle surface without having the film thicker than is normally desirable. This is due to the relatively low amount of urea and paraffin wax at the particle surface.

The base particles, prepared in a manner such as that described above, are then treated to form a thin film of urea-paraffin wax adduct on the surface thereof. A suitable and preferred treating procedure involves dipping the solid base particles into an adduct accelerator, for example acetone, in liquid phase for about 12 seconds to 5 minutes, removing the particles from the acetone, and removing the residual acetone which adheres to the surface of the particles by, for example, allowing it to evaporate. Evaporation of this residual acetone from the surface of the wet particles, which occurs quite rapidly under normal atmospheric conditions but which can be hastened by the use of a fan, etc., leaves a film of urea-paraffin wax adduct on the surface of the particles. The formtion of the thin adduct film, which itself is white to light gray in color, is readily observed when the base particles are black as is the case when they contain asphalt. When the particles are removed from the acetone they appear about the same, i.e., black, as before being dipped into the acetone, the only difference being that the particles appear wet. As the acetone evaporates, however, the particles take on a gray appearance. This gray appearance is due to the thin film of adduct which forms over the surface of the particle. Apparently the adduct, or at least the urea component thereof, is soluble in acetone and hence no crystalline adduct appears until the acetone evaporates from the surface of the particle.

The thickness of the adduct film on a particle can be increased by increasing the time for which the particle is submerged in acetone. As an extreme case the entire particle can be converted to an adduct. Also, thinner films can be obtained by reducing the dipping time. If the particle is removed from the acetone too soon, the film fails to cover the particle surface, in which case the particle surface appears to have "freckles" of adduct on its surface. In such a case the dipping time should be increased. It is generally desirable for several reasons, however, that the adduct film be of very small thickness, about paper thin. One reason for this is that a film of about this thickness is all that is required to impart non-caking properties to the particle. A general rule is that if there is any visual thickness to the film when a treated particle is cut in half and examined, the film is thicker than is required to render the particle non-caking. The second reason for desiring a very thin film is that the urea component of the adduct film is, with one exception mentioned hereafter, rapidly leached out of the film when the particles are submerged in water. In other words the film portion of the slow release fertilizer is a fast release fertilizer. Since commercially acceptable fertilizer particles should have a longest dimension of about one-sixteenth inch at the most, a film of any considerable thickness will result in a substantial portion of the urea in the particle being fast release. This is, of course, undesirable. However, if a very thin film is formed the amount of urea actually present in the adduct film is small while non-caking properties are still obtained.

Although it is clearly undesirable to have the adduct film so thick that a substantial portion of the particle is fast release, the rapid release of urea from a thin film is actually advantageous in some cases. When a homeowner applies to his lawn urea, ammonium nitrate, or any other conventional nitrogen fertilizer not treated to make it slow-release, the grass usually becomes very deep green within a day or so of application because the grass rapidly takes up a relatively large amount of nitrogen. Typical homeowners are accustomed to this and have come to expect it. A typical slow-release nitrogen fertilizer does not usually give this result because the nitrogen is slow release, and homeowners are sometimes disappointed. Since the thin adduct shell of the present compositions is fast release, the grass changes color in the traditional manner and the homeowner is satisfied. This result is achieved even though the shell is no thicker than that required to render the particles non-caking.

When employing a liquid adduct accelerator as in the above description the dipping time required to form an adduct film of the desirable thickness described is normally about 12 seconds to 5 minutes, usually 12–120 seconds, although somewhat longer or even shorter times will sometimes be more beneficial. The optimum dipping time varies depending upon such factors as the specific accelerator employed, the temperature of the accelerator and base particles, the melting point of the paraffin wax, and the presence of additives, and the specific type thereof, in the wax phase. Since the rate of the urea-paraffin wax adduction reaction increases with increasing temperature, the optimum dipping time can be shortened by raising the temperature of the base particles and/or the adduct accelerator. The influence of the paraffin wax melting point on the dipping time has already been described. Of the numerous accelerators acetone has been found so far to require the shortest dipping time, the time usually being about 20–60 seconds.

In the above description the adduct accelerator used to form the film was acetone. Although acetone is clearly the preferred accelerator, other accelerators can also be used, for example, alcohols such as methanol and ethanol, isopropanol, other ketones such as methyl isobutyl ketone, methyl ethyl ketone, etc., ammonia, aqueous ammonia, glycols such as ethylene glycol, low boiling mercaptans such as ethyl mercaptan, low boiling amines such as ethylamine, dioxane, esters such as ethyl acetate, water, and the like. When these other accelerators are used, however, film formation generally takes longer than with acetone. For example, if a dispersion of urea in wax, the wax containing polymerized wood rosin dissolved therein, is dipped into methanol, removed, and the residual methanol on the surface of the dispersion is allowed to evaporate, an adduct film does not result immediately upon completion of the evaporation step. Rather the film forms slowly over a period of 30 minutes to 2 days thereafter. In a commercial operation it would be more advantageous to use acetone and thus reduce the processing time required. Similarly, water can also be used as the accelerator but in this case also the time required to form the film is considerably longer than with acetone. For these reasons acetone is the preferred adduct accelerator. In addition, any ketone or alcohol accelerator is preferable to the other accelerators mentioned since they are generally more efficient than the latter.

It has already been mentioned that the adduct accelerator is preferably employed as a liquid, in which case contact of the accelerator and the base particles is preferably effected by dipping, i.e., submerging, immersing, etc. the particles into the accelerator. It is not essential that a liquid accelerator be employed, however, for the surface adduct film can also be formed by contacting the base particles with accelerator vapor. A convenient method of practicing this embodiment of the invention involves passing acetone vapor, for example, through a bed of base particles contained within a suitable enclosure such as a column. As the acetone vapor contacts the particles the adduct film begins to form. If the conditions within the column are such that no condensation of acetone vapor occurs, then there is, of course, no residual acetone on the surface of the particles which need be removed to obtain the crystalline adduct. Passage of vapor through the bed of particles is continued until the surface of the particles is substantially completely covered with a thin adduct film. Contact between the acetone vapor and the particles is then ended by shutting off the acetone flow and the treated particles are recovered.

The reason why the use of the accelerator in vapor phase is generally less preferable than the use in liquid phase is that the time required for formation of the adduct film is generally considerably longer than when the same accelerator is employed as a liquid. Although the contact time can be reduced, for example, by increasing the temperature of the accelerator vapor and/or the particles, such techniques are also available when a liquid accelerator is employed, hence the difference in contact time remains.

There is one advantage of using the accelerator in vapor phase rather than liquid phase but this advantage is not usually substantial enough to offset the disadvantage of increased time required for film formation. The advantage of employing the accelerator as a vapor is that since the rate of film formation is lower the film thickness can be more closely controlled. For example, an optimum dipping time using liquid acetone may be one minute. If the dipping time is increased by one minute the resulting film would most likely be too thick. On the other hand, if acetone vapor is employed the optimum contact time is considerably longer, long enough so that an extra minute of contact has a negligible effect on the film thickness. This advantage is often not significant for the reason that accurate control of the dipping time in liquid acetone is not difficult.

Although the use of the accelerator in vapor phase is generally less efficient than a liquid phase operation, two methods of practicing the invention should be distinguished both of which involve the use of accelerator vapor but only one of which is solely a vapor phase method. The distinction between the two methods is condensation of the accelerator vapor on the surface of the base particles. In one method, acetone vapor, for example, is passed through a bed of particles contained within a column, the conditions of temperature, pressure, etc. within the column being such that no condensation of the acetone vapor occurs. For example the temperature of the bed can be maintained higher than that of the incoming acetone vapor. This method is solely a vapor phase method. On the other hand, if the bed of particles is at a lower temperature than the acetone vapor, some of the vapor will condense and liquid acetone will trickle over the particles. In this method the particles are being contacted with liquid acetone.

It was mentioned previously that the urea component of the adduct film is, with one exception, rapidly leached out of the film, i.e., when the particle is submerged in water the urea in the film dissolves almost immediately. The one exception occurs when the base particle is a dispersion of urea in wax, the wax having rosin dissolved therein, and the film is formed by exposing the particles to a humid atmosphere. By this procedure the film forms gradually over a period of 1–3 weeks. If the water resistance of the particles is determined at various stages during the 1–3 week film-forming period by submerging the particles in water and determining the amount of urea dissolved in the water at periodic intervals thereafter, it will be found that the water resistance gradually increases during the film-forming period and reaches a maximum at the time the film completely covers the particle surface. This result is opposite to that obtained with a film formed by acetone dipping for in this latter case the water resistance of the particle having a film is slightly lower than the same particle film-free. The reason for the difference described above is not known with certainty but is believed to be due to the difference in the rate at which the films form.

The term paraffin wax is used herein in accordance with its conventional meaning. It is one of only two kinds of waxes obtainable from petroleum, the other being microcrystalline wax. The differences and similarities between these two kinds of waxes are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
| --- | --- | --- |
| Molecular Weight | 250–500 | 500–800 |
| Melting Point, °F. (ASTM D-127) | 110–165 | 140–210 |
| Viscosity at 210° F., S.U.S. (ASTM D-446) | 30–50 | 60–100 |
| Penetration at 77° F., d.mm. (ASTM D-1321, 100 g., 5 sec.) | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystays and no well-formed crystals of any size. Indeed, microcrystalline wax is sometimes referred to as amorphous. Preferably the paraffin wax used in the compositions of the invention has a melting point, viscosity, and penetration within the ranges specified in Table I. All wax properties mentioned herein are by the appropriate tests indicated in Table I. For the reason mentioned hereinbefore the paraffin wax more preferably has a melting point in the range of 110°–145° F.

The following examples illustrate the invention more specifically. The first example is mainly to establish the nature of the surface film which is present in the compositions. The remaining examples illustrate the formation of the film on fertilizer particles of normal commercial size, the non-caking properties of the compositions prepared by our novel method, and the relatively small effect of the fertilizer water resistance of a film imparting non-caking properties to the fertilizer particles.

Example I 36 parts of a paraffin wax having a melting point of 129° F., a viscosity at 210° F. of 38 S.U.S. and a penetration at 77° F. of 18 d.mm. is charged to a mixing vessel equipped with heating and stirring means. The wax is heated to 240° F. To the wax is added 2 parts of polymerized wood rosin and 2 parts of asphalt. The rosin has been partially oxidized by heating at 140° F. for 3 days in the presence of air and at atmospheric pressure. The contents of the vessel are stirred until the rosin and asphalt dissolve in the wax. Next 60 parts of commercial crystal urea is added to the wax phase with stirring. This gross dispersion is then passed through a roller mill having a clearance small enough to subdivide the material passing therethrough to about 200 mesh. The discharge from the mill, a granular solid, is heated to 140° F. and thereupon becomes fluid. The fluid dispersion is charged to a mold and formed into a cylinder 6 inches long and 1 inch in diameter. The cylinder is allowed to cool and is then removed from the mold.

The cylinder is then submerged in acetone (at room temperature) for 15 minutes. After removal from the acetone the wet cylinder is allowed to dry by standing exposed to the atmosphere for 30 minutes. After the 30 minutes drying period the entire cylinder surface is covered with a layer of light colored material. The cylinder is cut in half and this layer is found to be about ⅛ inch thick. A portion of this layer is cut off with a knife and analyzed by X-ray diffraction and differential thermal analysis. It is found to be a urea-paraffin wax adduct.

Example II

The starting material of this example is a fluid dispersion obtained by following the procedure of Example I up to and including the heating of the roller mill discharge to 240° F. This fluid dispersion is molded into a plurality of particles substantially spherical in shape and having a diameter of about 1/16 inch. The particles are divided into three portions, A, B and C and those of portion A are submerged in acetone for 30 seconds. They are then removed and the residual acetone is allowed to evaporate which takes about 60 seconds. Evaporation of the acetone leaves an off-white film over the entire surface of the particles. Several of the particles are cut in half with a sharp knife and examined. The film is found to have no visible thickness. In fact, if only the cross-section of the particle could be seen the presence of the film could not be determined.

The particles in portion B are dusted with diatomaceous earth by shaking the particles with a quantity of earth and then separating the excess earth by screening. The resulting particles have a thin film of earth over their surface. This is a well known procedure for improving the anti-caking properties of particulate solids.

About 500 of each group of treated particles and a like quantity of the untreated particles from portion C are placed in three separate beakers and the beakers are then placed in an oven maintained at 175° F. After 30 minutes the beakers are removed and the contents examined. The untreated particles and the particles dusted with diatomaceous earth have melted and are found as a fluid mass in the bottoms of their respective beakers. The particles treated with acetone are essentially unchanged. They are still in the form of discrete particles and are still free flowing. They only change in the particles is that the surface film is slightly darker.

Example III

This example illustrates the ability of the compositions prepared by our novel method to remain free flowing when stored under pressure. The particles tested are further portions of each of the three groups of particles prepared in Example II. The test device is an aluminum block in which has been drilled a hole one inch in diameter and 4 inches long. The block has been stored in an oven at 120° F. for 8 hours prior to this example. The untreated particles are poured into the hole to a depth of 2 inches. Next an aluminum rod 4 inches long and just slightly under one inch in diameter is fitted into the hole and allowed to rest upon the particles. The top of the rod is equipped with a plate so that by placing weights on the plate the pressure on the particles can be adjusted to any desired level. Next sufficient weights are placed on the plate so that the pressure on the particles, including that due to the weight of the rod and plate is 134 pounds per square inch. This is equivalent to the pressure on the bottom bag of a stack of 80 pound bags 10 bags high and in which the area of each side of a bag in contact with an adjacent bag is 6 square feet. In other words, the large sides of the bags are, say, 2 feet by 3 feet.

The entire test device is then placed in an oven at 120° F. for 3 hours. After 3 hours the device is removed from the oven, the rod removed from the hole, and the aluminum block inverted so that the particles can fall out and be examined. This procedure is repeated two more times except that the two types of treated particles are used. The results are as follows:

The untreated particles can only be removed from the hole with some difficulty and then only as a single large lump.

The particles dusted with earth had retained their shape but many of them were stuck together in clusters.

The particles treated with acetone had also retained their shape but essentially none of them had struck together.

Example IV

A 10 gram quantity of particles of portion A of Example II and a like quantity of particles from portion C of Example II are each submerged in separate batches of water at room temperature and without agitation for 30 days. At the end of this time the water was analyzed for urea. The water in which the untreated particles from portion C were submerged contains 58% of the urea originally present in the submerged particles, i.e., 58% of the urea has been leached out. In the case of the particles having an adduct shell 55% of the urea has been leached out. Considering the length of the submergence test (30 days) this is a negligible difference.

Example V

A fluid dispersion is formed by the procedure by Example I except that instead of using 60 parts urea a mixture of 21.4 parts urea, 21.8 parts triple superphosphate, and 16.7 parts potassium chloride is used and the wax phase is 36.1 parts paraffin wax, 2.0 parts polyethylene having a molecular weight of 3000, and 2.0 parts asphalt. The dispersion is formed into particles of the same size as described in Example II.

The treated particles are dividend into three groups, one portion is treated with earth as in Example II, one portion remains untreated, and the other portion is dipped into acetone for 30 seconds after which the residual acetone on the particles is allowed to evaporate. A thin film of adduct on the surface of each acetone treated particle results.

A portion of each group of particles is subjected to the oven test described in Example II. The results are essentially the same i.e., only the particles having an adduct film are free-flowing.

Example VI

Another portion of each of the three groups of particles prepared in Example V are subjected to the pressure test described in Example III. The results are essentially the same, i.e., the earth dusted particles perform better than the untreated particles but the particles having an adduct film remain substantially more free flowing than either of the others.

Example VII

Discrete slow release fertilizer particles are prepared in the same manner as in Example II, the sole exception being that the rosin employed is not partially oxidized. The particles are placed in an atmosphere of air having a relative humidity of 100%. The air temperature is 75° F. The particles are examined each day and it is found that a urea-paraffin wax adduct gradually forms on the surface of the particles. At the end of twelve days the film substantially completely covers the surface of each particle. At this time the particles are subjected to the temperature and pressure tests described in Examples II and III respectively. The particles have substantially the same non-caking characteristics as the particles of portion A in Example II.

The invention claimed is:

1. Method of reducing the caking tendency of solid discrete fertilizer particles comprising a dispersion of solid urea in solid paraffin wax which comprises contacting the entire surface of said particles with a urea-paraffin wax adduct accelerator, whereby a reaction between urea and paraffin wax at the surface of said particles to form a urea-paraffin wax adduct is initiated, continuing said contacting for at least 12 seconds and until said reaction is initiated over substantially the entire surface of said particles, removing said adduct accelerator from contact with the surface of said particles, and recovering discrete particles each of which contains (1) a core which comprises a dispersion of solid urea in solid paraffin wax and (2) a thin continuous film, overlaying and adjacent to said core, of a urea-paraffin wax adduct formed in situ on the surface of said core, said thin film substantially completely covering the surface of said core.

2. Method according to claim 1 wherein said contacting is by immersing the discrete particles in a liquid adduct accelerator selected from the group consisting of alcohols and ketones for 0.2–5 minutes.

3. Method according to claim 1 wherein said adduct accelerator is acetone.

4. Method according to claim 1 wherein in the first mentioned dispersion the amount of urea is at least 50% based on the total weight of solid urea and solid paraffin wax.

5. Method according to claim 1 wherein in the first mentioned dispersion the solid paraffin wax contains rosin and asphalt dissolved therein, the amount of each being a minor amount based on the total weight of rosin, asphalt, and solid paraffin wax.

6. Method according to claim 1 wherein in the first mentioned dispersion the amount of solid paraffin wax and any additives dissolved therein is 15–49 parts and the amount of urea is 10–80 parts.

References Cited by the Examiner

UNITED STATES PATENTS

| 2,727,025 | 12/1955 | Weitkamp | 260—96.54 |
| 2,795,495 | 6/1957 | Schmatloch | 71—64 |
| 2,936,226 | 5/1960 | Kaufman et al. | 117—100 |
| 3,014,783 | 12/1961 | Young | 117—100 |
| 3,096,171 | 7/1963 | Woerther | 71—64 |
| 3,202,501 | 8/1965 | Petterson | 71—64 |

FOREIGN PATENTS

| 245,105 | 5/1963 | Australia. |

DONALL H. SYLVESTER, *Primary Examiner.*

ANTHONY SCIAMANNA, *Examiner.*

T. D. KILEY, *Assistant Examiner.*